United States Patent
Garcarz et al.

(10) Patent No.: US 11,546,290 B1
(45) Date of Patent: Jan. 3, 2023

(54) ADJUSTING DNS RESOLUTION BASED ON PREDICTED APPLICATION EXPERIENCE METRICS

(71) Applicant: Cisco Technology, Inc., San Jose, CA (US)

(72) Inventors: Michal Wladyslaw Garcarz, Cracow (PL); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/379,424

(22) Filed: Jul. 19, 2021

(51) Int. Cl.
  *H04L 61/4511* (2022.01)
  *H04L 41/5009* (2022.01)
  *H04L 61/10* (2022.01)

(52) U.S. Cl.
  CPC ...... *H04L 61/4511* (2022.05); *H04L 41/5009* (2013.01); *H04L 61/10* (2013.01)

(58) Field of Classification Search
  CPC ... H04L 41/5009; H04L 61/10; H04L 61/1511
  See application file for complete search history.

(56) References Cited

U.S. PATENT DOCUMENTS

| | | | |
|---|---|---|---|
| 8,326,980 B2 | 12/2012 | Huang et al. | |
| 9,246,874 B2 | 1/2016 | Joe et al. | |
| 10,447,648 B2 | 10/2019 | Bliss et al. | |
| 10,797,995 B2 | 10/2020 | Richardson et al. | |
| 2013/0242340 A1* | 9/2013 | Liu | G06Q 30/02 358/1.15 |
| 2017/0332146 A1* | 11/2017 | Klappert | H04N 21/251 |
| 2018/0202821 A1* | 7/2018 | Yu | G01C 21/3423 |
| 2019/0027255 A1* | 1/2019 | D'Amelia | G08B 31/00 |
| 2021/0075761 A1 | 3/2021 | Li et al. | |

OTHER PUBLICATIONS

Gerend, et al., "Use DNS Policy for Application Load Balancing", online: https://docs.microsoft.com/en-us/windows-server/networking/dns/deploy/app-lb, Jan. 5, 2021, 5 pages, Microsoft Docs.

* cited by examiner

*Primary Examiner* — Gil H. Lee
(74) *Attorney, Agent, or Firm* — Behmke Innovation Group LLC; Kenneth J. Heywood; Jonathon P. Western (57) ABSTRACT

In one embodiment, a device obtains application experience metrics for an online application. The device predicts, based on the application experience metrics, future application experience metrics for each of a set of provider endpoints for the online application. The device selects, based on the future application experience metrics, a particular provider endpoint from among the set of provider endpoints. The device provides, to a Domain Name System (DNS) resolver, resolution information for one or more of the set of provider endpoints that causes a query for one of those provider endpoints to resolve to an address of the particular provider endpoint.

20 Claims, 10 Drawing Sheets

FIG. 7

ADJUSTING DNS RESOLUTION BASED ON PREDICTED APPLICATION EXPERIENCE METRICS

TECHNICAL FIELD

The present disclosure relates generally to computer networks, and, more particularly, to adjusting Domain Name System (DNS) resolution based on predicted application experience metrics.

BACKGROUND

Modern software as a service (SaaS) applications are delivered globally via public cloud infrastructure using cloud native services. Even though public cloud providers might have high number of Points of Presence (POP)/provider endpoints and use those to deliver global application, application experience metrics from the standpoint of the users of the application might vary greatly based on their locations. This is typically because cloud providers deliver services which are region based, leading to the application being served from a specific geographic region or location (or a few specific regions or locations).

Even though it might seem that the online application is global, such as due to a set of globally available POPs, in reality the application might run in a single region/location. Consequently, user experiences with the online application might vary greatly based on that location.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains application experience metrics for an online application. The device predicts, based on the application experience metrics, future application experience metrics for each of a set of provider endpoints for the online application. The device selects, based on the future application experience metrics, a particular provider endpoint from among the set of provider endpoints. The device provides, to a Domain Name System (DNS) resolver, resolution information for one or more of the set of provider endpoints that causes a query for one of those provider endpoints to resolve to an address of the particular provider endpoint

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
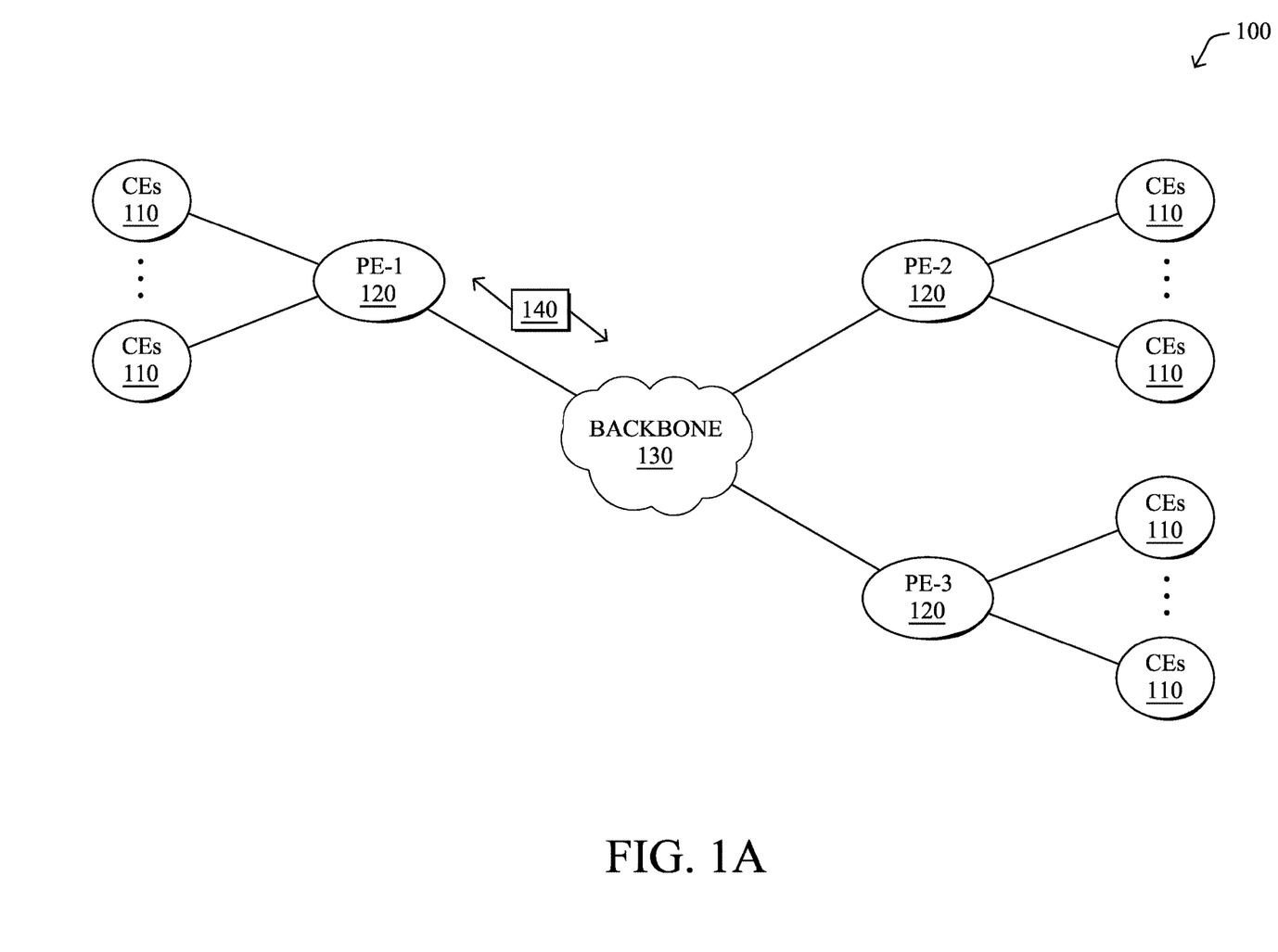
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
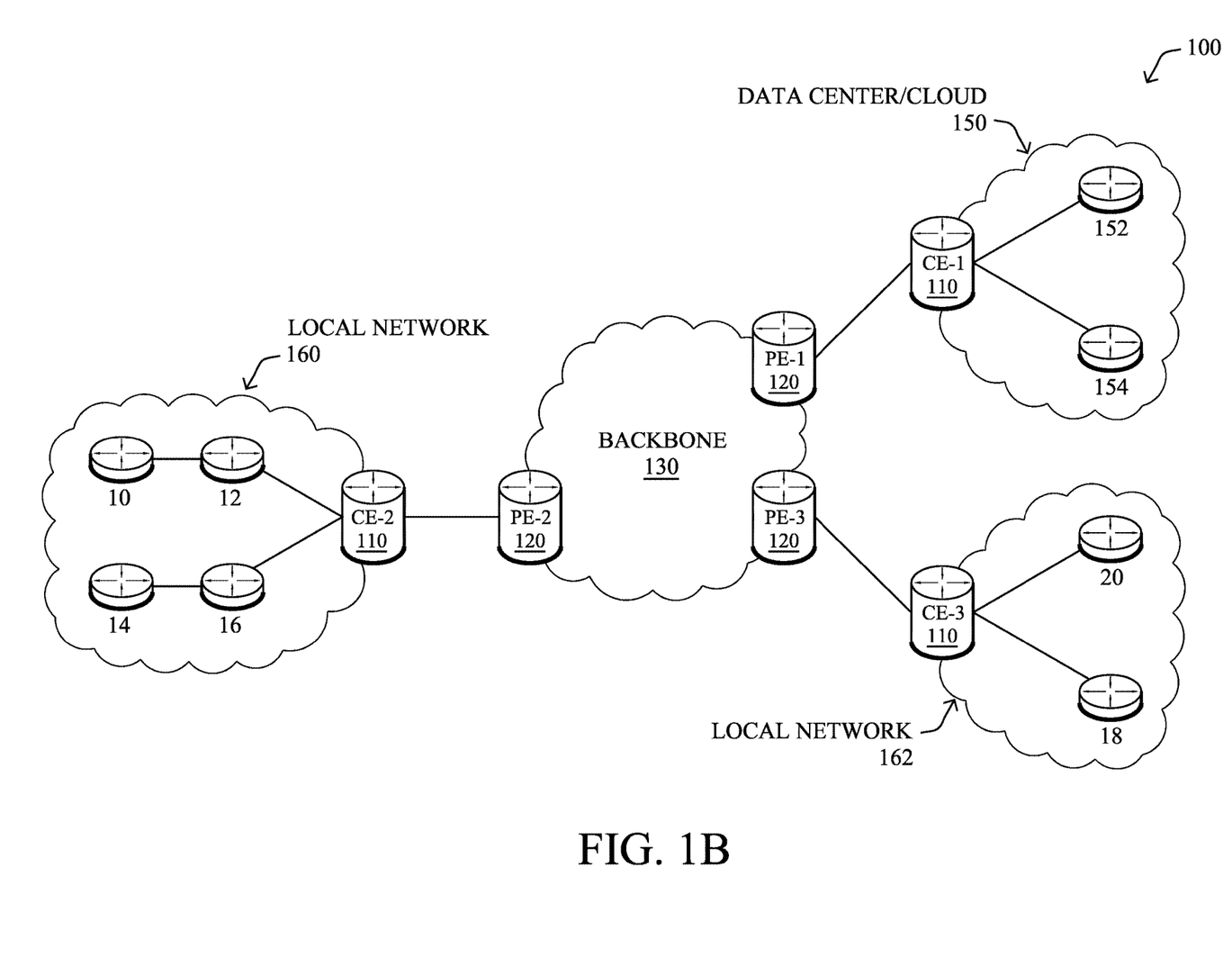

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
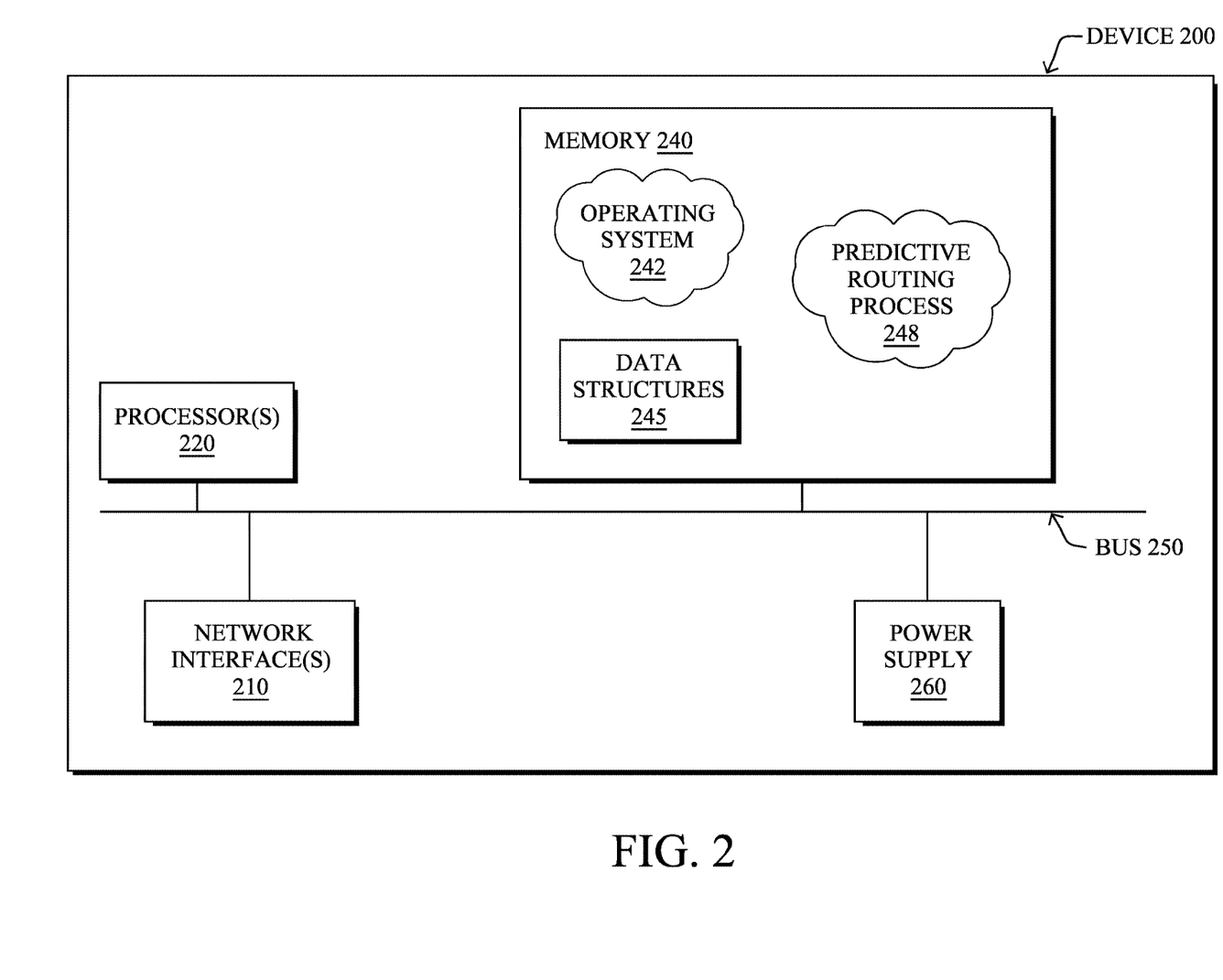
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
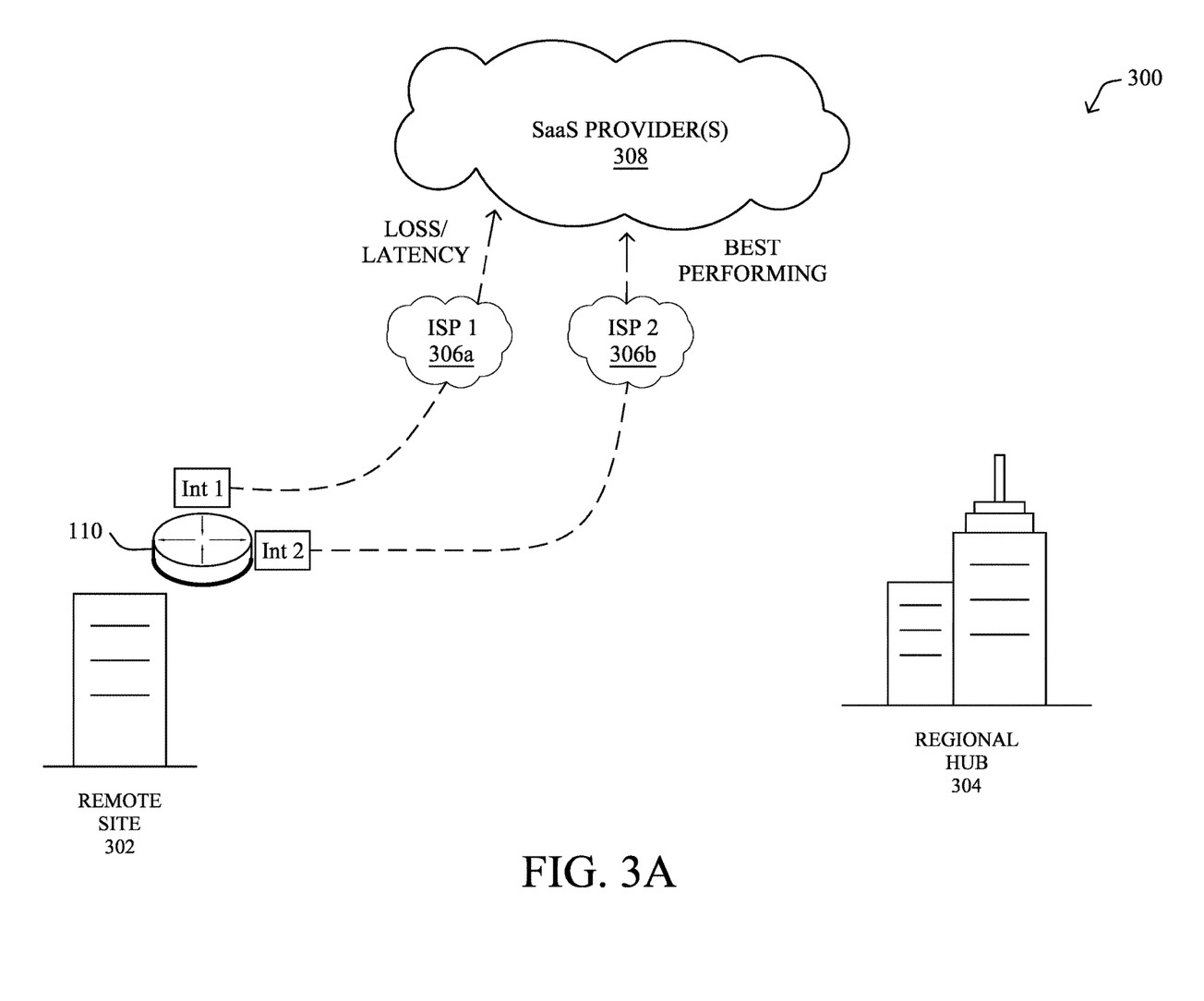
FIGS. 3A-3B illustrate example network deployments.
Figure 3B:
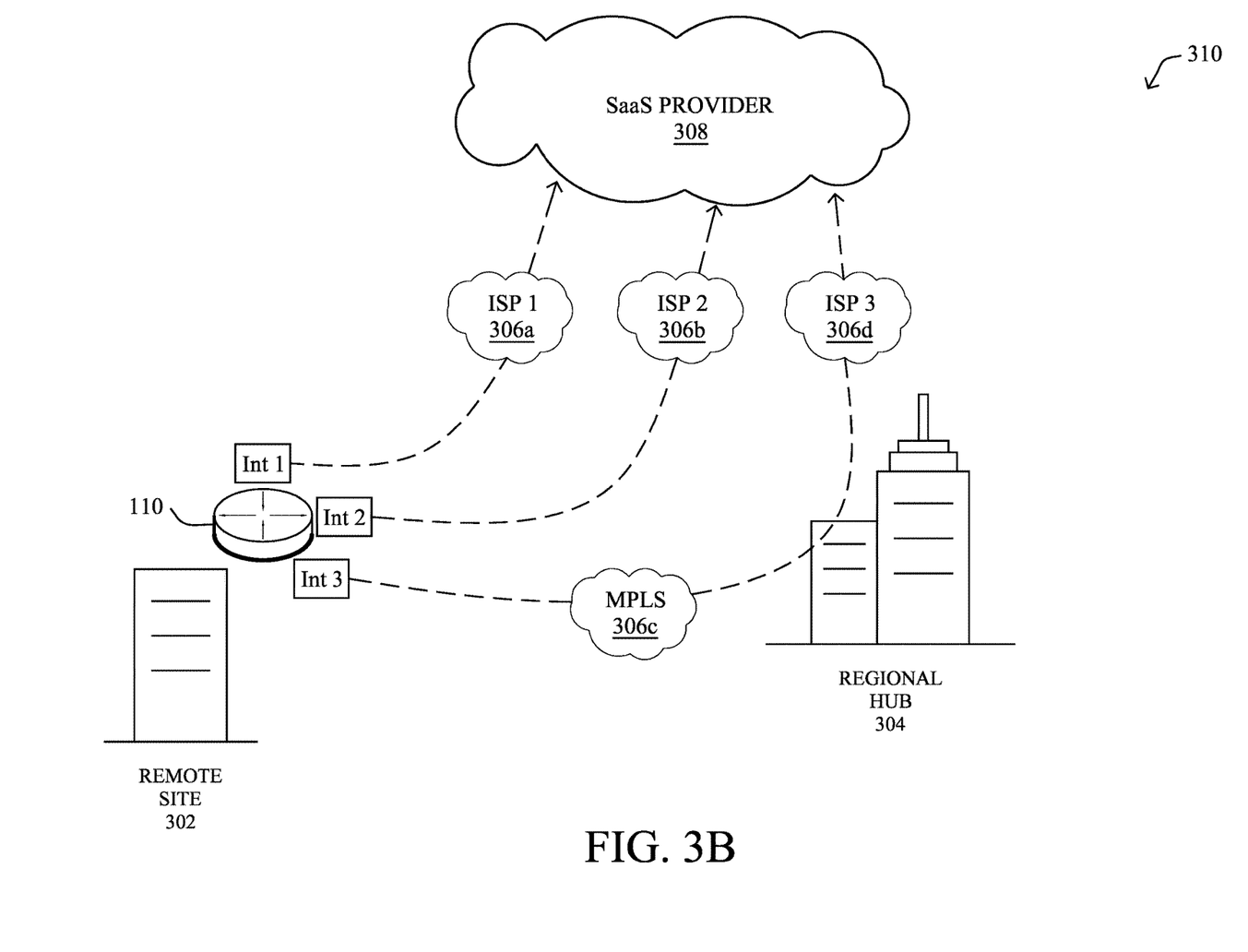

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
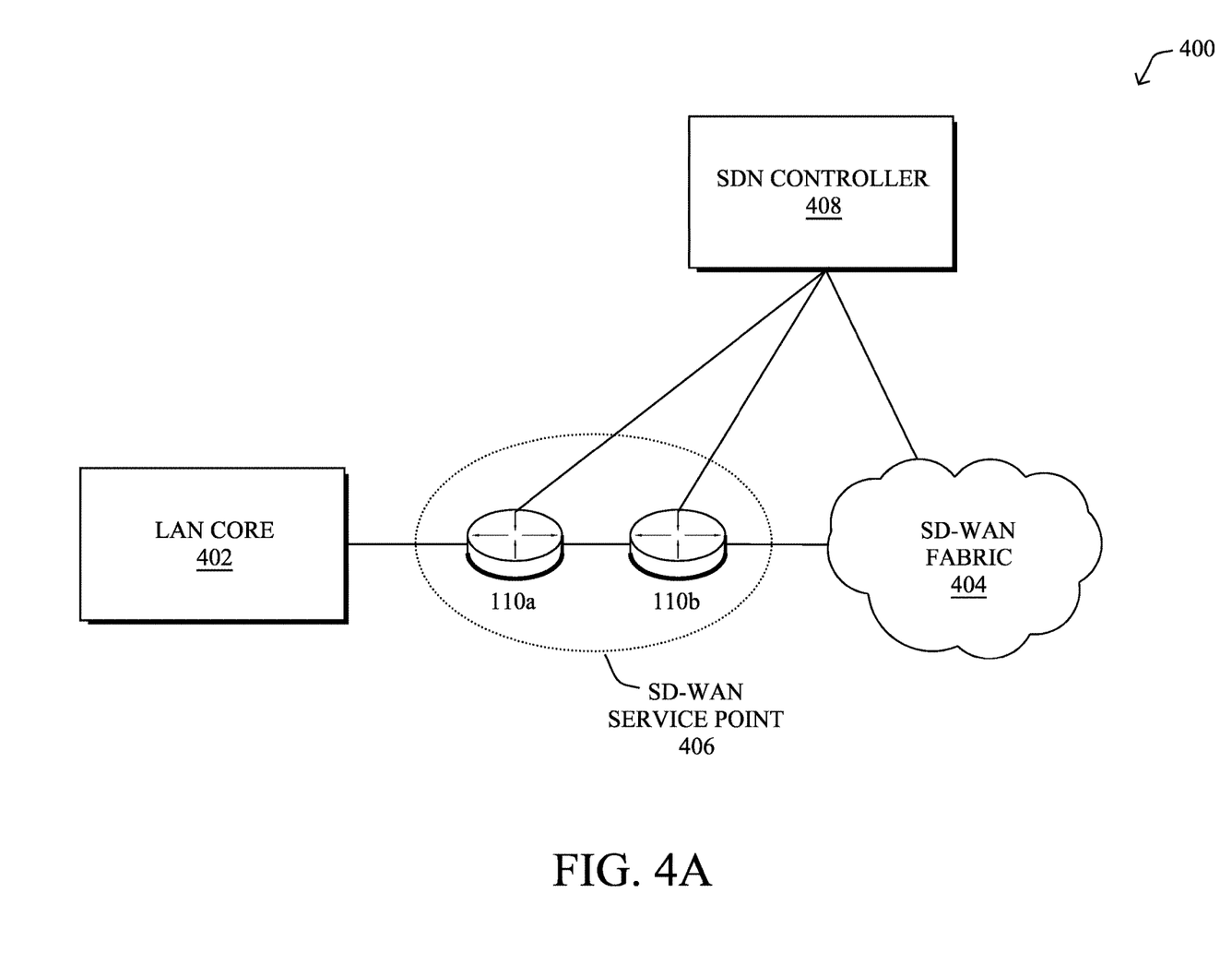
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (Si's) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
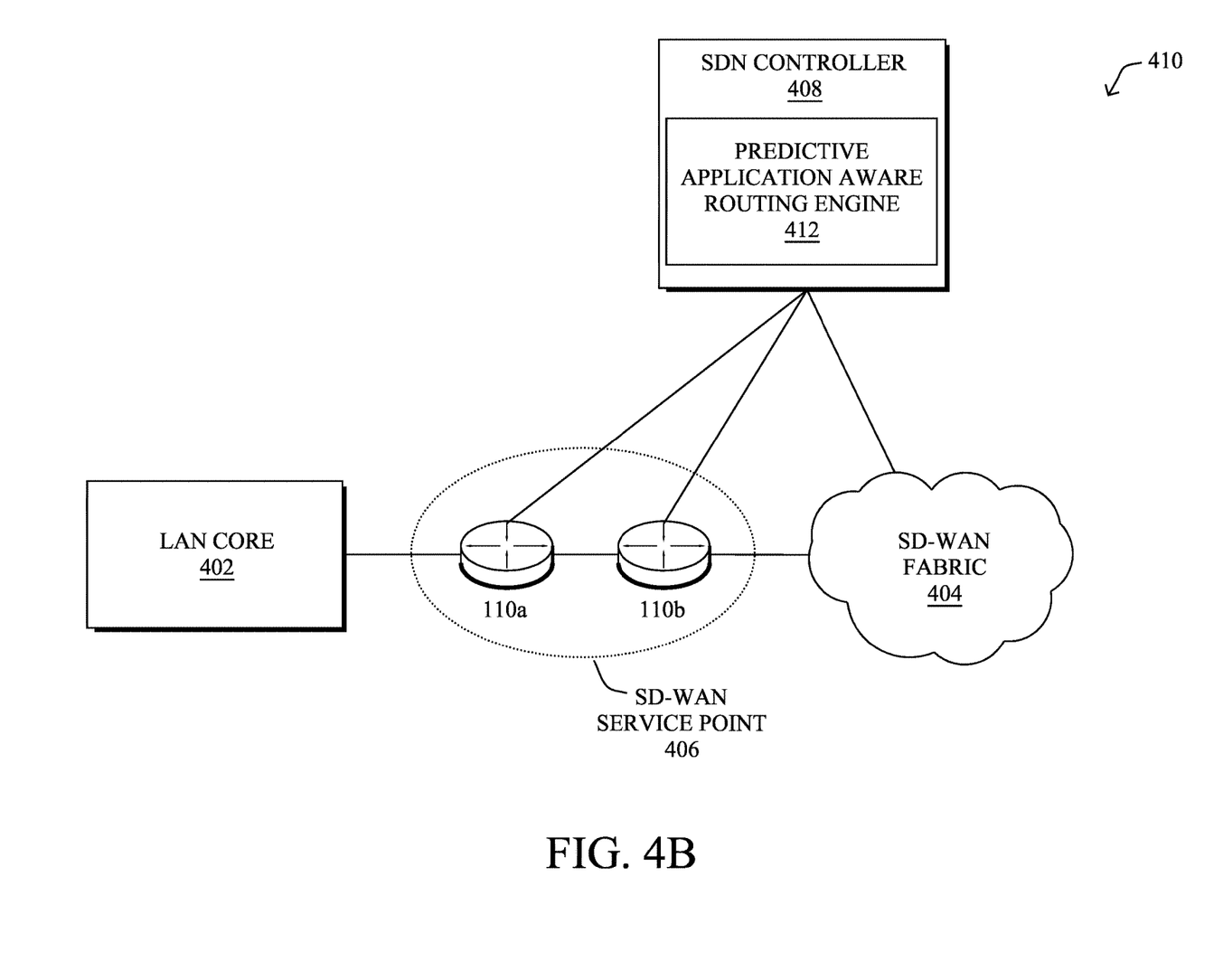

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize through-put at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, modern software as a service (SaaS) applications are delivered globally via public cloud infrastructure using cloud native services. Even though public cloud providers might have high number of Points of Presence (POP)/provider endpoints and use those to deliver global application, application experience metrics from the standpoint of the users of the application might vary greatly based on their locations. This is typically because cloud providers deliver services which are region based, leading to the application being served from a specific geographic region or location (or a few specific regions or locations).

Even though it might seem that the online application is global, such as due to a set of globally available POPs, in reality the application might run in a single region/location. Consequently, user experiences with the online application might vary greatly based on that location.

Adjusting DNS Resolution Based on Predicted Application Experience Metrics

The techniques herein propose leveraging a predictive application aware engine, such as predictive application aware routing engine 412, to select a provider endpoint for an online application (e.g., a data center, POP, etc.) that offers the best predicted application experience. In some aspects, the techniques herein may discover the location(s) of the SaaS application, knowing that such location is governed by the application provider and outside of the network control. Then, the prediction engine can determine the best path according to its specified objective(s), such as avoiding SLA violations, optimizing optimize user quality of experience, etc. In further aspects, the techniques herein effect the location change by adjusting the destination server hosting the application using the Domain Name System (DNS) protocol. Said differently, since the location where a SaaS application is hosted cannot be controlled by the network, the idea is for the predictive engine to determine which (SaaS) location provides the best service considering the network environment and then control, via DNS, the server to be selected Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Figure 5:
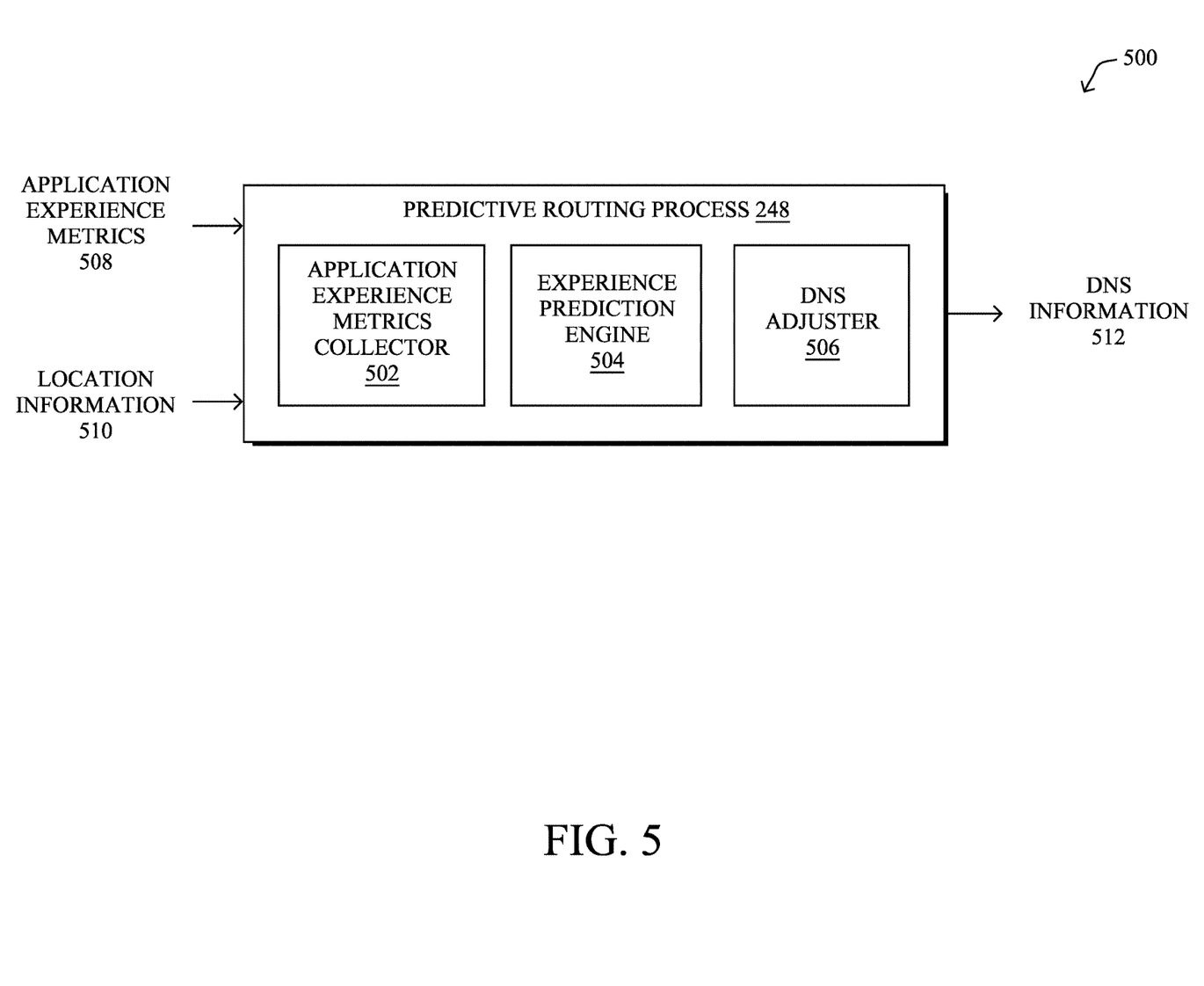
FIG. 5 illustrates an example architecture for adjusting Domain Name System (DNS) resolution based on predicted application experience metrics.

Specifically, according to various embodiments, a device obtains application experience metrics for an online application. The device predicts, based on the application experience metrics, future application experience metrics for each of a set of provider endpoints for the online application. The device selects, based on the future application experience metrics, a particular provider endpoint from among the set of provider endpoints. The device provides, to a Domain Name System (DNS) resolver, resolution information for one or more of the set of provider endpoints that causes a query for one of those provider endpoints to resolve to an address of the particular provider endpoint Operationally, FIG. 5 illustrates an example architecture 500 for adjusting DNS resolution based on predicted application experience metrics, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), a DNS resolver, another device or service in communication therewith, or the like, to provide a supervisory service to the network. More specifically, predictive routing process 248 may operate in conjunction with a predictive application aware routing engine, such as predictive application aware routing engine 412, or directed implemented as a component thereof, in some embodiments.

As shown, predictive routing process 248 may include any or all of the following components: an application experience metrics collector 502, an experience prediction engine 504, and/or a DNS adjuster 506. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

In various embodiments, a key functionality of predictive routing process 248 lies in the ability to dynamically (and proactively) reconfigure a variety of DNS services, in order to return the most optimal DNS responses per client and application (domain). More specifically, predictive routing process 248 may adjust the DNS records for the online application to specify the endpoint address(es) that are predicted to provide the best application experience to users of the online application.

According to various embodiments, application experience metrics collector 502 may obtain application experience metrics 508, either on a pull or push basis. In general, application experience metrics collector 502 may include feedback from users of the online application. For instance, application experience metrics 508 may include satisfaction ratings specified by the users of the online application regarding their satisfaction, or lack thereof, with the application (e.g., on a scale of 0-5, etc.). In some instances, application experience metrics collector 502 may obtain application experience metrics 508 directly from the online application provider itself, such as when application experience metrics 508 are specified via in-application surveys. In other cases, application experience metrics 508 may be obtained from the client devices of those users, such as through the execution of local survey agents. In further cases, application experience metrics 508 may be obtained through surveys sent via text message, email, phone, or the like. Note also that application experience metrics 508 may include raw survey information, aggregated survey information (e.g., statistics such as the mean and standard deviation), or even path metrics associated with the user sessions (e.g., latency, jitter, packet loss, etc.).

In some embodiments, application experience metrics collector 502 may also obtain location information 510 in conjunction with application experience metrics 508. Typically, application experience metrics 508 and location information 510 may be grouped as part of the same records, but could also be received by predictive routing process 248, separately. Generally speaking, location information 510 may indicate the locations of the client devices of the users of the online application that specified application experience metrics 508. For instance, location information 510 may indicate the cities, metropolitan areas, postal codes, counties, states, countries, continents, or the like, in which the clients of the online application are located.

According to various embodiments, experience prediction engine 504 may use application experience metrics 508 (and location information 510, if available), to predict future application experience metrics for the online application for different provider endpoints. Indeed, there may be a set of different provider endpoints located at different geographic locations throughout a country, region, or even across the globe. Accordingly, experience prediction engine 504 may predict the future application experience metrics for a specific SaaS application (DNS domain) and locations.

In some embodiments, experience prediction engine 504 may comprise a machine learning-based prediction model that uses application experience metrics 508 and/or location information 510 to predict future application experience metrics for the different potential provider endpoints for the online application. For instance, assume that the online application has potential POPs in Japan, Singapore, and China. In such a case, experience prediction engine 504 may use the historical application experience metrics for the differently located clients of the online application to predict which of these would provide the 'best' application experience for any given set of clients/users.

In some instances, the predictions by experience prediction engine 504 may also be temporal in nature. More specifically, experience prediction engine 504 may also take into account timestamp information for application experience metrics 508 and/or location information 510 when making its predictions, to predict future application experience metrics for a particular period of time. For instance, experience prediction engine 504 may determine that the provider endpoint of the application located in Japan will offer the best predicted application experience metrics on Tuesdays during a certain time window, based on a record of previously obtained application experience metrics 508.

In various embodiments, DNS adjuster 506 may select, based on the predictions by experience prediction engine 504, a particular provider endpoint from among the set of provider endpoints that has been predicted to provide the "best" application experience. In turn, DNS adjuster 506 may proactively reprogram a DNS resolver by providing DNS information 512 that indicates the selected particular provider endpoint. More specifically, DNS information 512 may cause the DNS resolver to resolve a query for one of those provider endpoints to resolve to an address of the particular provider endpoint.

By way of example, DNS information 512 may take the form of a DNS A record that injects a new address for a specified domain. As a result, when a client tries to connect to a desired provider endpoint, it will issue a DNS query to the DNS resolver, which will return a DNS response that indicates the address of the selected provider endpoint. Consequently, the client will connect to the online application via the provider endpoint predicted by experience prediction engine 504 to offer the best application experience metrics.

As will be appreciated, DNS adjuster 506 may provide DNS information 512 to any number and/or different types of DNS resolvers. For example, a DNS resolvers may take the form of any or all of the following:

a cloud native DNS service such as Amazon Web Services (AWS) Route53 or Cisco Umbrella, an endpoint-based DNS resolver such as native Mac OS X, Linux, Windows or another application running on a client endpoint (e.g., Cisco AnyConnect Umbrella Agent)

network-based DNS services deployed on routers/firewalls (like Cisco Umbrella agent deployed on IOS-XE router), which may also be on-premise.

Depending on the specific type of DNS resolver, DNS adjuster 506 may use different approaches to adjust the DNS records, accordingly. For instance, in the case of a cloud-based DNS service, DNS adjuster 506 may provider DNS information 512 to the resolver via an application programming interface (API) or the like, to dynamically add/remove the correct DNS entries and configuration). For on-prem DNS services like Bind or Microsoft Active Directory, a set of scripts and tools can do the same. DNS to adjuster 506 could also control DNS resolvers running directly on the client endpoint using solutions like Cisco AnyConnect Umbrella Agent.

According to various embodiments, the DNS adjustments by DNS adjuster 506 may be implemented using either of the following approaches:

Dynamic DNS Caching: in this mode, DNS adjuster 506 may determine the most optimal time to live (TTL) value for DNS information 512, to keep the DNS records short enough for the application to refresh its domain, frequently. DNS adjuster 506 can also compute the TTL based on the outcome of the prediction. For example, if the predictions is that a server X will be most appropriate for SaaS application A for a user U for the next two hours, DNS adjuster 506 may set the TTL value, accordingly. Said differently, predictive routing process 248 may function to dynamically control the DNS TTL value for DNS information 512, based on its predictions.

Scheduled-based DNS Records: in this mode, DNS information 512 may take the form of a DNS Type A record that specifies a schedule. Such a schedule may provide a list of addresses during specific time periods, according to the predictions by experience prediction engine 504. For instance, the provider endpoint located in Singapore may be predicted to offer the best application experience during Tuesday morning, but the endpoint located in Japan may be predicted to provide the best application experience during Tuesday afternoon.

In summary, predictive routing process 248 may dynamically interact with a DNS resolver according to its predictions regarding application experience metrics for different provider endpoints, so as to avoid poor user quality of experience. Here, predictive routing process 248 not only selects the best endpoint in a predictive manner, but also leverages DNS to convey the results of this selection to clients of the online application, while also allowing for the use of a dynamic TTL or schedule.

Figure 6:
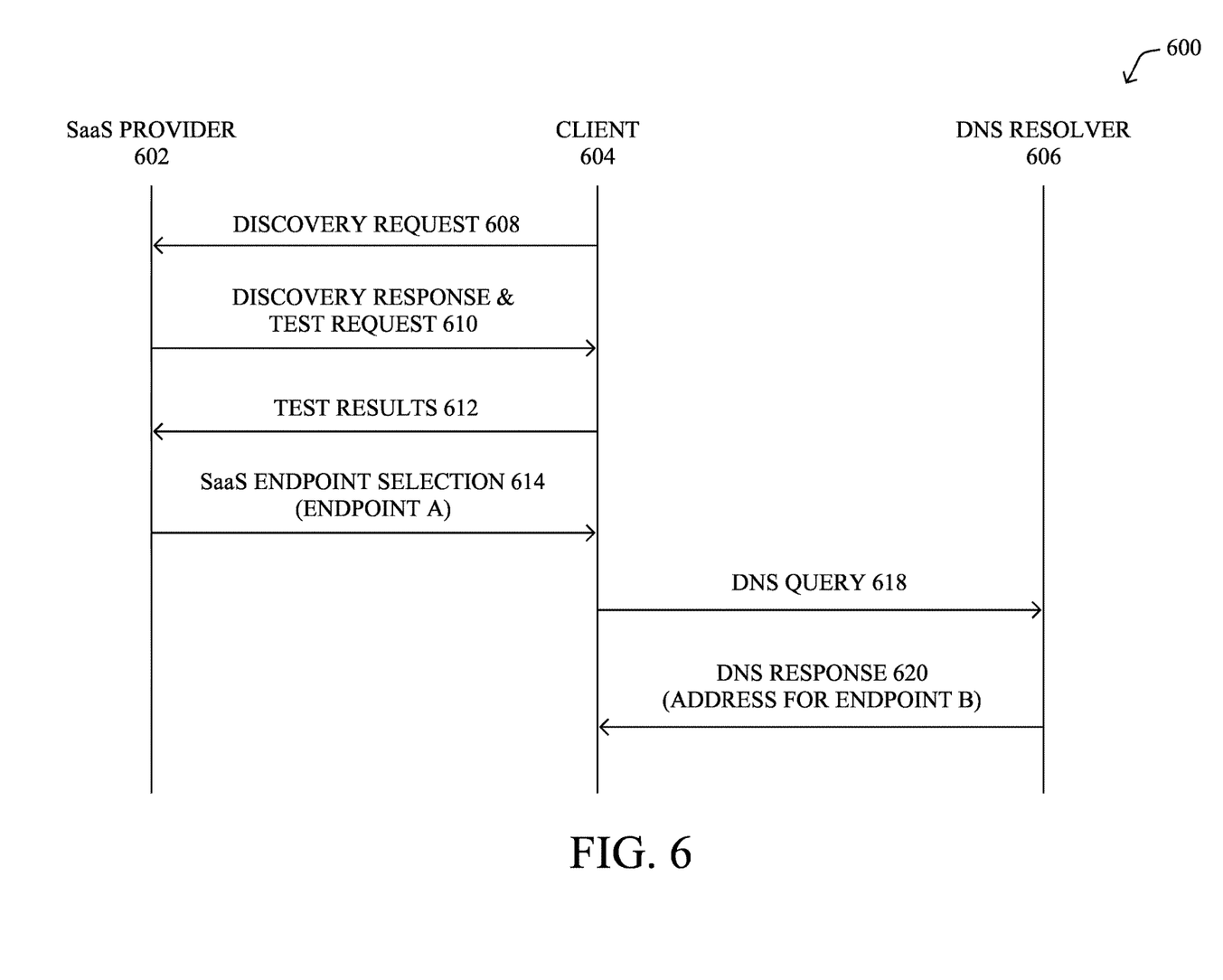
FIG. 6 illustrates an example sequence diagram for DNS resolution based on predicted application experience metrics.

FIG. 6 illustrates an example sequence diagram 600 for DNS resolution based on predicted application experience metrics, according to various embodiments. Using the techniques above, assume that there is a client 604 that wishes to access an online application associated with SaaS provider 602. To do so, client 604 may begin by sending a discovery request 608 to SaaS provider 602, indicating a desire of client 604 to connect with the online application.

In turn, SaaS provider 602 may respond with a discovery response and test request 610. For instance, test request 610 may list the n-number of closest endpoint providers to client 604 for the online application. In addition, test request 610 may also specify any parameters for the testing (e.g., protocols to use, packet information, etc.). Client 604 may then conduct the requested testing of the specified provider endpoints.

Once client 604 has completed its testing, it may send test results 612 back to SaaS provider 602. SaaS provider 602 may then select one of the provider endpoints, based on test results 612, and report the endpoint selection 614 back to client 604. For instance, assume that SaaS provider 602 has selected endpoint A to be used by client 604 to access the SaaS application. Based on endpoint selection 614, client 604 may then send a DNS query 616 to its DNS resolver 606 for the address of endpoint A.

Typically, DNS resolver 606 would return the address of endpoint A, which client 604 would then use to access the online application. However, now assume that a predictive engine (e.g., through execution of predictive routing process 248) has predicted that endpoint B would actually provide the best application experience to client 604 at the time. Accordingly, its DNS resolver 606 may have adjusted the DNS record for endpoint A such that it points to the address of endpoint B. In such a case, its DNS resolver 606 may return a DNS response 618 to client 604 that includes the address for endpoint B, not endpoint A. As a result, client 604 will access the online application using the best predicted endpoint, regardless of the selection by SaaS provider 602.

Figure 7:
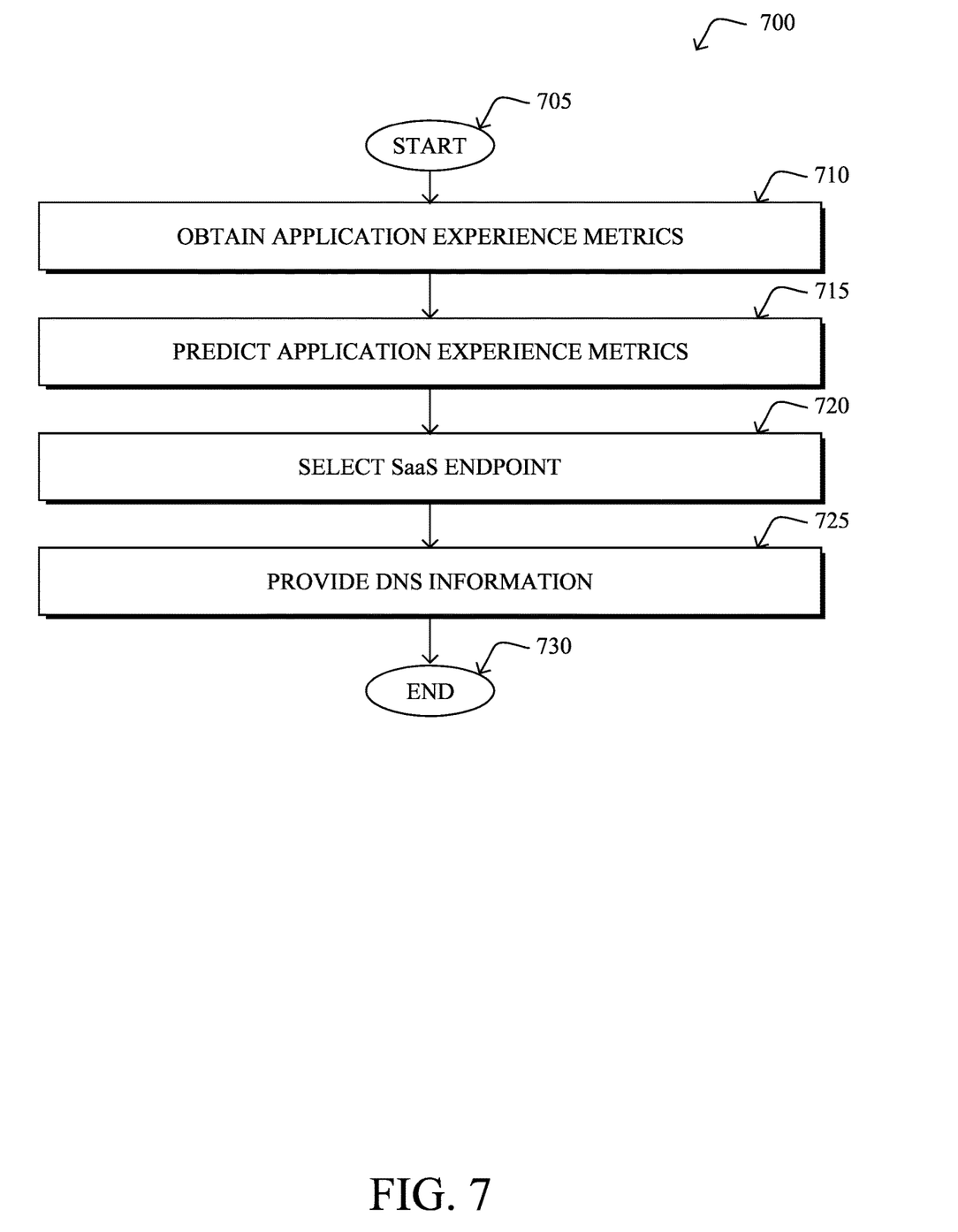
FIG. 7 illustrates an example simplified procedure for selecting a provider endpoint of an online application.

FIG. 7 illustrates an example simplified procedure 700 (e.g., a method) procedure for selecting a provider endpoint of an online application, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., predictive routing process 248), to provide a supervisory service to a network. The procedure 700 may start at step 705, and continues to step 710, where, as described in greater detail above, the device may obtain application experience metrics is for an online application. In some embodiments, the application experience metrics may comprise feedback from users of the online application. For instance, users of the online application may be prompted to rate their satisfaction with the application either directly within the application itself or through another survey mechanism (e.g., a separate agent, an email or text message-based survey, etc.). In further embodiments, the online application may be a software as a service (SaaS) application that may have data centers located at different geographic locations (e.g., different cities, countries, etc.). In some embodiments, the application experience metrics may also include location information regarding client locations of the online application associated with the application experience metrics.

At step 715, as detailed above, the device may predict, based on the application experience metrics, future application experience metrics for each of a set of provider endpoints for the online application. In one embodiment, the device may do so using a machine learning-based prediction model. In further embodiments, the device may predict the future application experience metrics for sessions between each of the client locations and each of the set of provider endpoints. In some embodiments, the device may also predict the future application metrics for a specific time period (e.g., for n-number of minutes, days, etc.).

At step 720, the device may select, based on the future application experience metrics, a particular provider/SaaS endpoint from among the set of provider endpoints, as described in greater detail above. For instance, the device may rank the provider endpoints by their predicted future application experience metrics and select the provider endpoint having the best predicted metrics.

At step 725, as detailed above, the device may provide, to a Domain Name System (DNS) resolver, resolution information for one or more of the set of provider endpoints. In various embodiments, the resolution information causes a query for one of those provider endpoints to resolve to an address of the particular provider endpoint. For instance, the resolution information may cause a query sent to the DNS resolver during the specific time period for one of those provider endpoints to resolve to an address of the particular provider endpoint. In further embodiments, a client that sent the query to the DNS resolver may access the online application via the address of the particular provider endpoint. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for improved application experience by predicting the future application experiences associated with using different provider endpoints of an online application. In some embodiments, the techniques herein may leverage DNS record updating, so as to remain transparent to the client of the online application.

While there have been shown and described illustrative embodiments that provide for adjusting DNS resolution based on predicted application experience metrics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable is medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, application experience metrics indicative of a user experience for an online application;
   predicting, by the device and based on the application experience metrics, future application experience metrics for each of a set of provider endpoints for the online application, the future application experience metrics indicative of a future user experience for the online application;
   selecting, by the device and based on the future application experience metrics, a particular provider endpoint from among the set of provider endpoints; and
   providing, by the device and to a Domain Name System resolver, resolution information for one or more of the set of provider endpoints that causes a query for one of the one or more of the set of provider endpoints to resolve to an address of the particular provider endpoint.

2. The method as in claim 1, wherein the application experience metrics obtained by the device comprise feedback from users of the online application.

3. The method as in claim 1, wherein the online application is a software as a service application.

4. The method as in claim 1, wherein the application experience metrics obtained by the device comprise location information regarding client locations of the online application associated with the application experience metrics.

5. The method as in claim 4, wherein the device predicts the future application experience metrics for sessions between each of the client locations and each of the set of provider endpoints.

6. The method as in claim 1, wherein the device predicts the future application experience metrics using a machine learning-based prediction model.

7. The method as in claim 1, wherein the device predicts the future application experience metrics for a specific time period.

8. The method as in claim 7, wherein the resolution information causes a query sent to the Domain Name System resolver during the specific time period for one of those provider endpoints to resolve to an address of the particular provider endpoint.

9. The method as in claim 1, wherein a client that sent the query to the Domain Name System resolver accesses the online application via the address of the particular provider endpoint.

10. The method as in claim 1, wherein the provider endpoints for the online application comprise data centers located at different geographic location.

11. An apparatus, comprising:
    one or more network interfaces;
    a processor coupled to the one or more network interfaces and configured to execute one or more processes; and
    a memory configured to store a process that is executable by the processor, the process when executed configured to:
      obtain application experience metrics indicative of a user experience for an online application;
      predict, based on the application experience metrics, future application experience metrics for each of a set of provider endpoints for the online application, the future application experience metrics indicative of a future user experience for the online application;
      select, based on the future application experience metrics, a particular provider endpoint from among the set of provider endpoints; and
      provide, to a Domain Name System resolver, resolution information for one or more of the set of provider endpoints that causes a query for one of the one or more of the set of provider endpoints to resolve to an address of the particular provider endpoint.

12. The apparatus as in claim 11, wherein the application experience metrics obtained by the apparatus comprise feedback from users of the online application.

13. The apparatus as in claim 11, wherein the application experience metrics obtained by the apparatus comprise location information regarding client locations of the online application associated with the application experience metrics.

14. The apparatus as in claim 13, wherein the apparatus predicts the future application experience metrics for sessions between each of the client locations and each of the set of provider endpoints.

15. The apparatus as in claim 11, wherein the apparatus predicts the future application experience metrics using a machine learning-based prediction model.

16. The apparatus as in claim 11, wherein the apparatus predicts the future application experience metrics for a specific time period.

17. The apparatus as in claim 16, wherein the resolution information causes a query sent to the Domain Name System resolver during the specific time period for one of those provider endpoints to resolve to an address of the particular provider endpoint.

18. The apparatus as in claim 11, wherein a client that sent the query to the Domain Name System resolver accesses the online application via the address of the particular provider endpoint.

19. The apparatus as in claim 11, wherein the provider endpoints for the online application comprise data centers located at different geographic location.

20. A tangible, non-transitory, computer-readable medium storing program instructions that cause a device to execute a process comprising:

obtaining, by the device, application experience metrics indicative of a user experience for an online application;

predicting, by the device and based on the application experience metrics, future application experience metrics for each of a set of provider endpoints for the online application, the future application experience metrics indicative of a future user experience for the online application;

selecting, by the device and based on the future application experience metrics, a particular provider endpoint from among the set of provider endpoints; and     providing, by the device and to a Domain Name System resolver, resolution information for one or more of the set of provider endpoints that causes a query for one of the one or more of the set of provider endpoints to resolve to an address of the particular provider endpoint.

\* \* \* \* \*